(12) United States Patent
Berg

(10) Patent No.: US 11,185,938 B2
(45) Date of Patent: Nov. 30, 2021

(54) CONSTRUCTION SITE DEVICE FOR DETERMINING THE PRESENCE OF A DENSITY GRADIENT IN A WORKING MATERIAL

(71) Applicant: HUSQVARNA AB, Huskvarna (SE)

(72) Inventor: Johan Berg, Alingsås (SE)

(73) Assignee: Husqvarna AB, Huskvarna (SE)

( * ) Notice: Subject to any disclaimer, the term of this patent is extended or adjusted under 35 U.S.C. 154(b) by 477 days.

(21) Appl. No.: 16/082,388

(22) PCT Filed: Mar. 6, 2017

(86) PCT No.: PCT/SE2017/050204
§ 371 (c)(1),
(2) Date: Sep. 5, 2018

(87) PCT Pub. No.: WO2017/155449
PCT Pub. Date: Sep. 14, 2017

(65) Prior Publication Data
US 2019/0070681 A1    Mar. 7, 2019

(30) Foreign Application Priority Data
Mar. 9, 2016    (SE) .................................. 1650316-1

(51) Int. Cl.
*B23D 59/00*    (2006.01)
*B25F 5/00*    (2006.01)
(Continued)

(52) U.S. Cl.
CPC ......... *B23D 59/001* (2013.01); *B23D 59/008* (2013.01); *B25F 5/00* (2013.01);
(Continued)

(58) Field of Classification Search
None
See application file for complete search history.

(56) References Cited

U.S. PATENT DOCUMENTS 3,991,644 A * 11/1976 Sugimoto ............ B23D 55/088
83/800
4,157,231 A *  6/1979 Phillips ................. E21B 19/086
408/1 R (Continued)

FOREIGN PATENT DOCUMENTS

CN    101539637 A    9/2009
GB    2466383 B      3/2014
(Continued)

OTHER PUBLICATIONS

Malegaonkar, A., et al., "IOE building management," An IP.com Prior Art Database Technical Disclosure, ip.com, IP.com No. IPCOM000242439D, IP.com Electronic Publication: Jul. 14, 2015, pp. 1-7.

(Continued)

*Primary Examiner* — Daniel S Larkin
(74) *Attorney, Agent, or Firm* — Burr & Forman, LLP

(57) ABSTRACT

A construction site status monitoring device is provided including processing circuitry configured to receive sensor data from a sensor associated with a construction device including a working element, determine a presence of a density gradient in a working material based on the sensor data, and cause an automatic response relative to operation of he working element based on the determination of the presence of the density gradient.

18 Claims, 5 Drawing Sheets

(51) Int. Cl.
*G01N 29/04* (2006.01)
*G01N 29/06* (2006.01)
*G01N 29/14* (2006.01)
*G01N 9/36* (2006.01)
*G01V 3/08* (2006.01)
*G06T 19/00* (2011.01)

(52) U.S. Cl.
CPC ............... *G01N 9/36* (2013.01); *G01N 29/04* (2013.01); *G01N 29/043* (2013.01); *G01N 29/06* (2013.01); *G01N 29/14* (2013.01); *G01V 3/08* (2013.01); *G01V 3/081* (2013.01); *G01N 2291/02818* (2013.01); *G06T 19/00* (2013.01)

(56) References Cited

U.S. PATENT DOCUMENTS

| | | | | |
|---|---|---|---|---|
| 4,198,150 | A | * | 4/1980 | Sloop ..................... F16M 13/04 |
| | | | | 362/3 |
| 6,978,503 | B2 | * | 12/2005 | Del Cogliano ........ B25D 1/045 |
| | | | | 7/143 |
| 8,277,154 | B2 | * | 10/2012 | Brown ............... G05B 19/4163 |
| | | | | 408/1 R |
| 8,364,309 | B1 | * | 1/2013 | Bailey .................. G05D 1/0272 |
| | | | | 700/245 |
| 2002/0054798 | A1 | | 5/2002 | Dils et al. |
| 2005/0165576 | A1 | | 7/2005 | Jesmonth |
| 2006/0002233 | A1 | | 1/2006 | Malard |
| 2010/0202846 | A1 | * | 8/2010 | Borunda ................. B25B 23/00 |
| | | | | 408/241 G |
| 2010/0277332 | A1 | | 11/2010 | Billings |
| 2011/0148437 | A1 | | 6/2011 | Lawrence |
| 2013/0010287 | A1 | | 1/2013 | Tutton |
| 2013/0307532 | A1 | | 11/2013 | Reime |

FOREIGN PATENT DOCUMENTS

| | | |
|---|---|---|
| WO | 94/27168 A1 | 11/1994 |
| WO | 2007/002542 A2 | 1/2007 |
| WO | 2012/109345 A1 | 8/2012 |
| WO | 2014164964 A1 | 10/2014 |

OTHER PUBLICATIONS

International Type Search Report for Swedish Application No. 1650316-1 dated Nov. 23, 2016.
International Search Report and Written Opinion for International Application No. PCT/SE2017/050204 dated Jul. 11, 2017.
International Preliminary Report on Patentability for International Application No. PCT/SE2017/050204 dated Sep. 11, 2018.

* cited by examiner

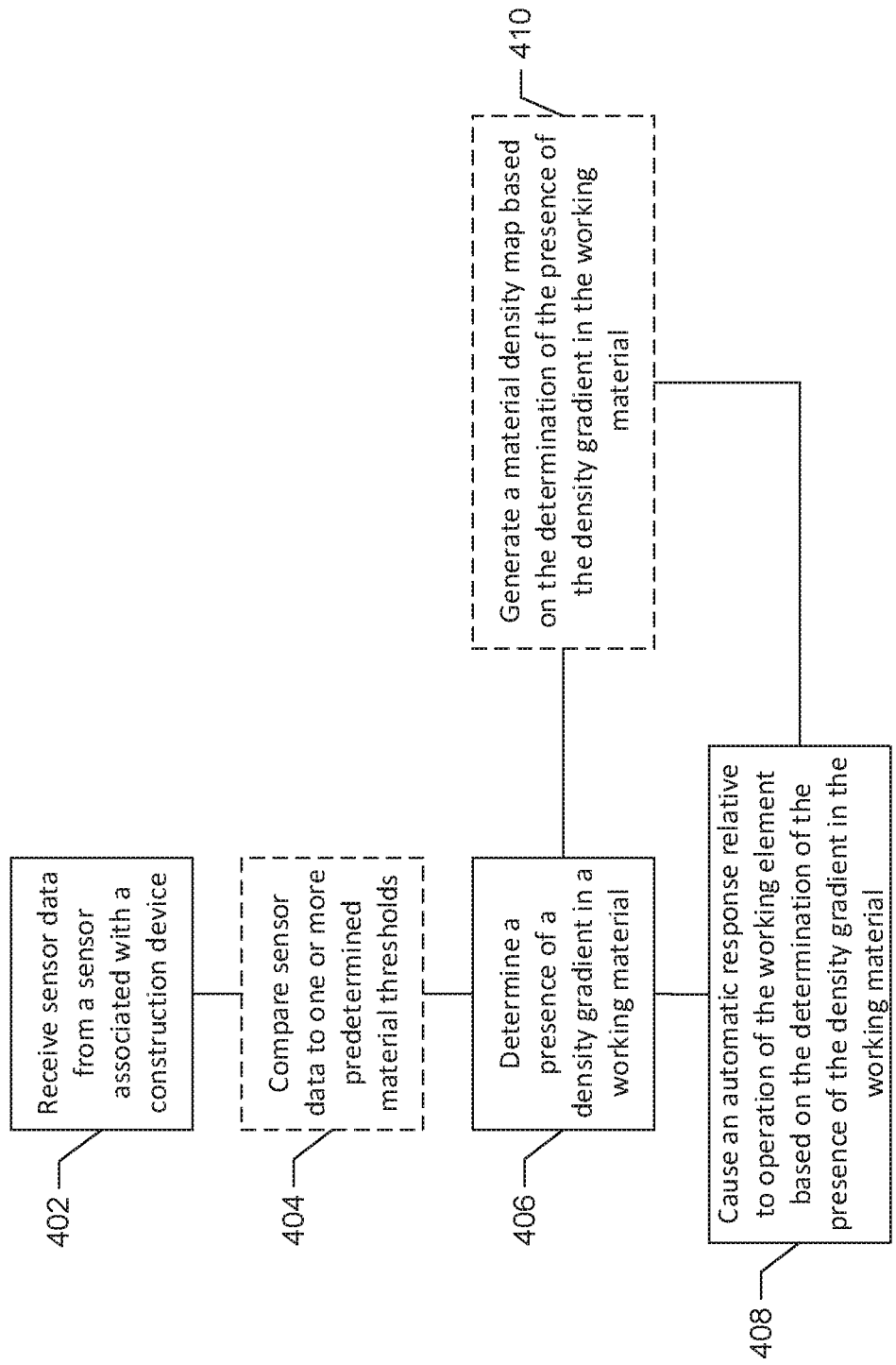

CONSTRUCTION SITE DEVICE FOR DETERMINING THE PRESENCE OF A DENSITY GRADIENT IN A WORKING MATERIAL

TECHNICAL FIELD

Example embodiments generally relate to construction equipment and, more particularly, relate to a construction site device for determining the presence of a density gradient in a working material.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like. Thus, these devices have the capability to be sources of risk for damage to equipment or people.

In some instances working materials, such as floors, walls, roofs or the like may include different materials, for example a floor may consist primarily of concrete, but also include rebar for structural support. Similarly floors and walls may include wood or drywall but also include spaced studs or other supports, pipes, or electrical cabling. Careless operation of a construction device in an area including a change in the density of the working material may cause damage to the construction device or unintentional operation, such as bucking or jerking.

BRIEF SUMMARY OF SOME EXAMPLES

In an example embodiment, a construction site status monitoring device is provided including processing circuitry configured to receive sensor data from a sensor associated with a construction device including a working element, determine a presence of a density gradient in a working material based on the sensor data, and cause an automatic response relative to operation of the working element based on the determination of the presence of the density gradient.

In another example embodiment, a construction site status monitoring system is provided including a construction device comprising a sensor and a working element and a construction site monitoring device comprising processing circuitry configured to receive sensor data from the sensor, determine a presence of a density gradient in a working material based on the sensor data, and cause an automatic response relative to operation of the working element based on the determination of the presence of the density gradient.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 illustrates a method of utilizing construction site status monitoring device in relation to operation of construction device according to an example embodiment.

DETAILED DESCRIPTION

Figure 1:
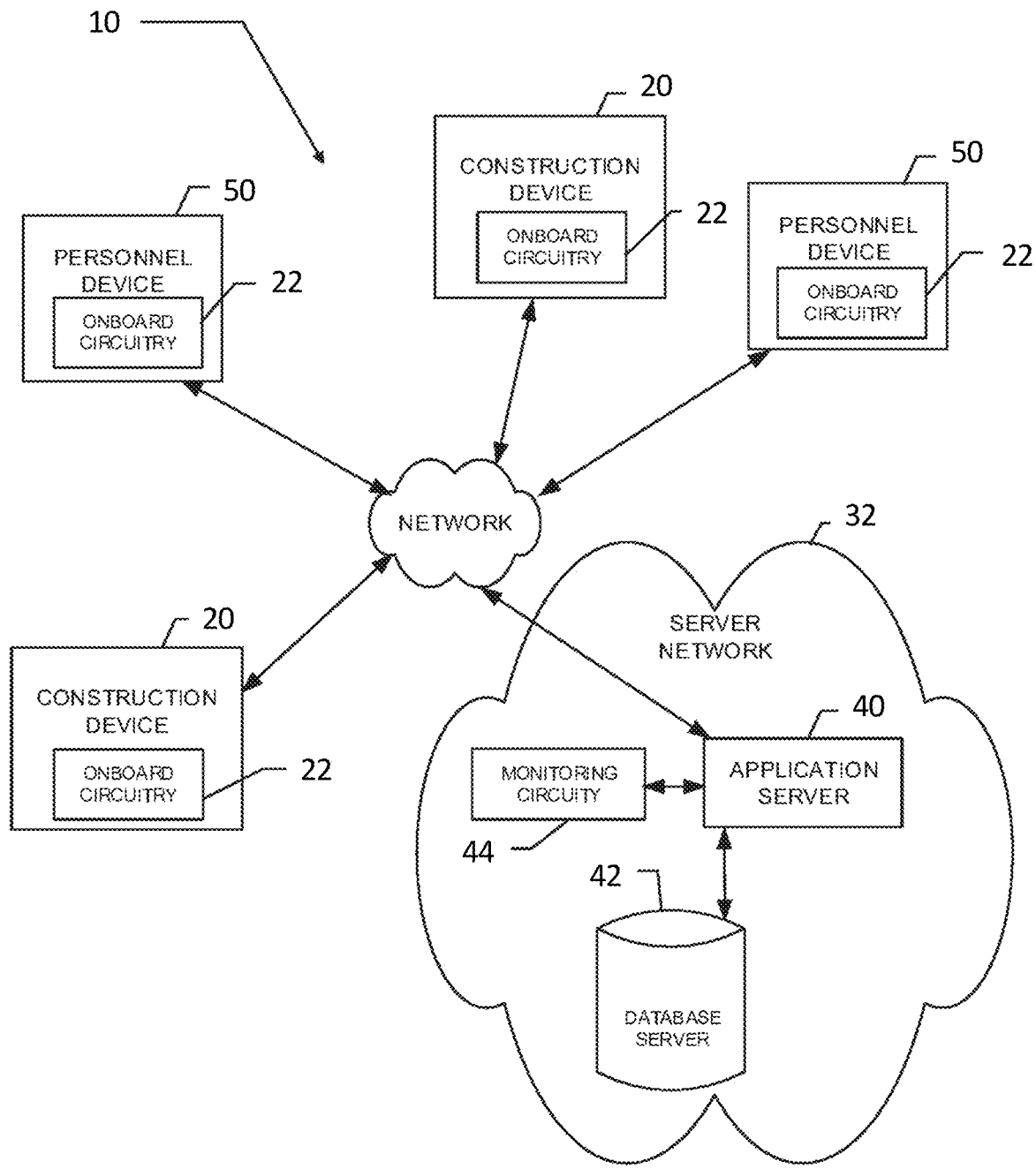
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different pieces of construction devices or personnel devices. The construction site status monitoring device may employ sensors, such as on a construction device, to determine the presence of a density gradient in a working material. The construction site status monitoring device may cause an indicator associated with the construction device to be activated to alert a user of potential changes in density in the working material, due to the presence of the density gradient in the working material. Additionally or alternatively, the construction site status monitoring device may cause a performance adjustment of the construction device based on the determination of the presence of the density gradient in the working material. The performance adjustment may include, without limitation, changing speed, direction, force, or coolant/lubrication flow of the construction device and/or the working element of the construction device, or the like.

In some example embodiments, the construction site status monitoring device may generate a material density map based on the determination of the presence of the density gradient in the working material. The material density map may be displayed on a personnel device, such as a personal data assistant or computing glasses, or on a graphic user interface of a construction device. In an embodiment in which the personnel device is transparent, such as computing glasses, or is equipped with a camera, the material density map may be projected in the field of view in the case of the computing glasses, or overlaid in a virtual field of view, e.g. augmented reality. The augmented reality may be useful for an operator to plan work to avoid or compensate for dense material.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20 and personnel devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g. devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g. network 30). However, in other embodiments, multiple different sets of devices 20, 50 may be enabled to access other servers associated with different organizations, entities or groups via the same or a different network. Example embodiments may also be embodied in individual devices 20, 50 not connected to a network.

The devices 20, 50 may, in some cases, each include sensory, computing and/or communication devices associated with different devices 20, 50 that belong to or are associated with a single organization, for example fleet management of devices 20, 50 at a construction site. In another example, a first device 20, 50 may be associated with a first facility or location of a first organization. Meanwhile, a second device 20, 50 may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each one of the construction devices 20 may include a housing inside which a power unit or motor (not shown) is housed. In some embodiments, the power unit may be an electric motor an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of working elements (e.g. blades, cutting chains, drill bits, nailers, or the like). The construction devices 20 may include sensors for monitoring location, device operation, orientation, or the like, as discussed below in reference to FIG. 2.

Figure 2:
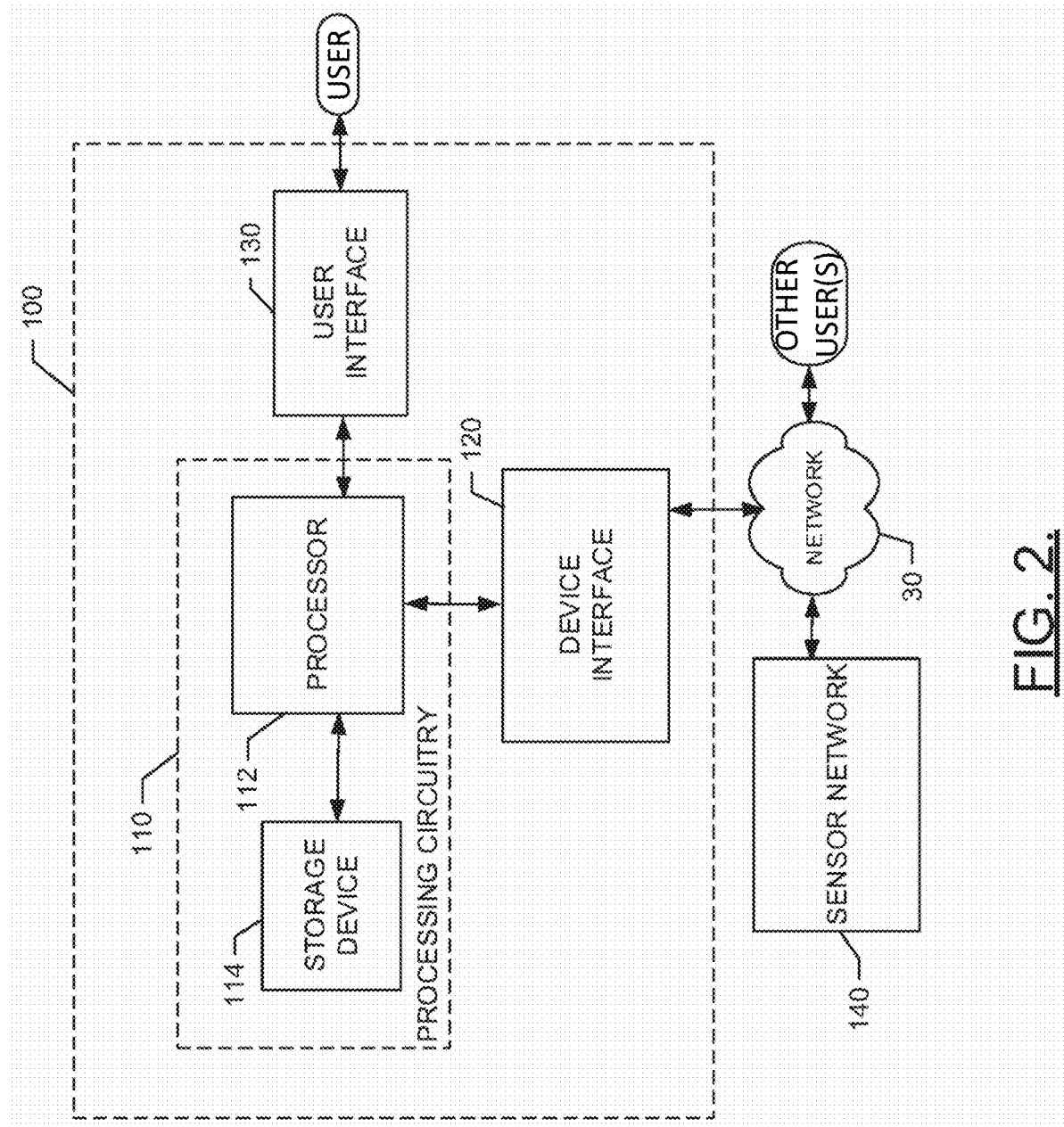
FIG. 2 illustrates a block diagram of one example of onboard electronics or monitoring circuitry that may be used in connection with employment of an example embodiment.

Each of the personnel devices 50 may include sensors, such as location sensors, cameras, scanners, or the like and/or a user interface, as discussed below in reference to FIG. 2.

In an example embodiment, each of the devices 20, 50 may include onboard circuitry 22 which may include or otherwise be embodied as a computing device (e.g. a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g. the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g. downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g. the Internet), and/or the like, which may couple the devices 20, 50 to devices such as processing elements (e.g. personal computers, server computers or the like) and/or databases. Communication between the network 30, the devices 20, 50 and the devices or databases (e.g. servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to density gradient identification, as will be described in greater detail below. For example, the application server 40 may be local or remote and configured to receive data from the devices 20, 50 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50 to locations throughout the construction site), or have actions associated therewith (e.g. send information, alerts, or safety interlocks to devices 20, 50). In some embodiments, the application server 40 may be configured to provide devices 20, 50 with instructions (e.g. for execution by the onboard circuitry 22) for taking prescribed actions when corresponding density gradients are identified.

Accordingly, in some example embodiments, data from devices 20, 50 may be provided to and analyzed at the application server 40 to identify or define a construction site status (CSS) (e.g. in real time or at a later time). The CSS may be associated with actions to be taken by the corresponding one of the devices 20, 50 that sent the data (or another device within the construction site) in response to a future detection of the CSS. The application server 40 may then equip one or more of the devices 20, 50 to detect the defined CSS in the future, and also provide instructions for actions to be taken when the defined CSS is encountered. Each one of the devices 20, 50 that has received the instructions may then detect the defined CSS and take the appropriate action. In one example embodiment, the CSS may include the identification of a density gradient in the working material and causing an automatic response action based on the identification of the density gradient.

Alternatively or additionally, data from devices 20, 50 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50 when an occurrence of the defined CSS is detected in the future.

In still other embodiments, the devices 20, 50 themselves may analyze data for detection of CSSs (e.g. using the onboard circuitry 22) and define and/or take action responsive to detecting the occurrence of a defined CSS. Thus, the devices 20, 50 may operate in some cases independently of the network 30 and the application server 40. However, in some cases, the application server 40 may be used to provide defined CSSs to the devices 20, 50 and the devices 20, 50 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with an embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device may be embodied in a construction device 20, a personnel device 50, a separate computing device, or be distributed among the devices 20, 50, and/or a separate computing device. The CSS monitoring device 100 may include processing circuitry 110 of an example embodiment, as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like. In some example embodiments, the user interface 130 may include remote user interfaces, such as a display on a personnel device 50, for example a smart phone or personal data assistant.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g. sensors that measure variable values related to device operational parameters like RPM, temperature, oil pressure, applied force, or the like; presence sensors that measure magnetic material presence or electromagnetic field presence; and/or sensors that measure device movement employing movement sensor circuitry) of the construction device 20 via the device interface 120. In one embodiment, sensors of the sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local position determining capabilities. In other words, the movement sensor circuitry may be configured to detect movement of the devices 20, 50 based on inertia-related measurements or other location determining information. In some example embodiments, the movement sensor circuitry may include orientation sensors, configured to detect the orientation of a device, particularly the working element of the device relative a determined location.

Figure 3:
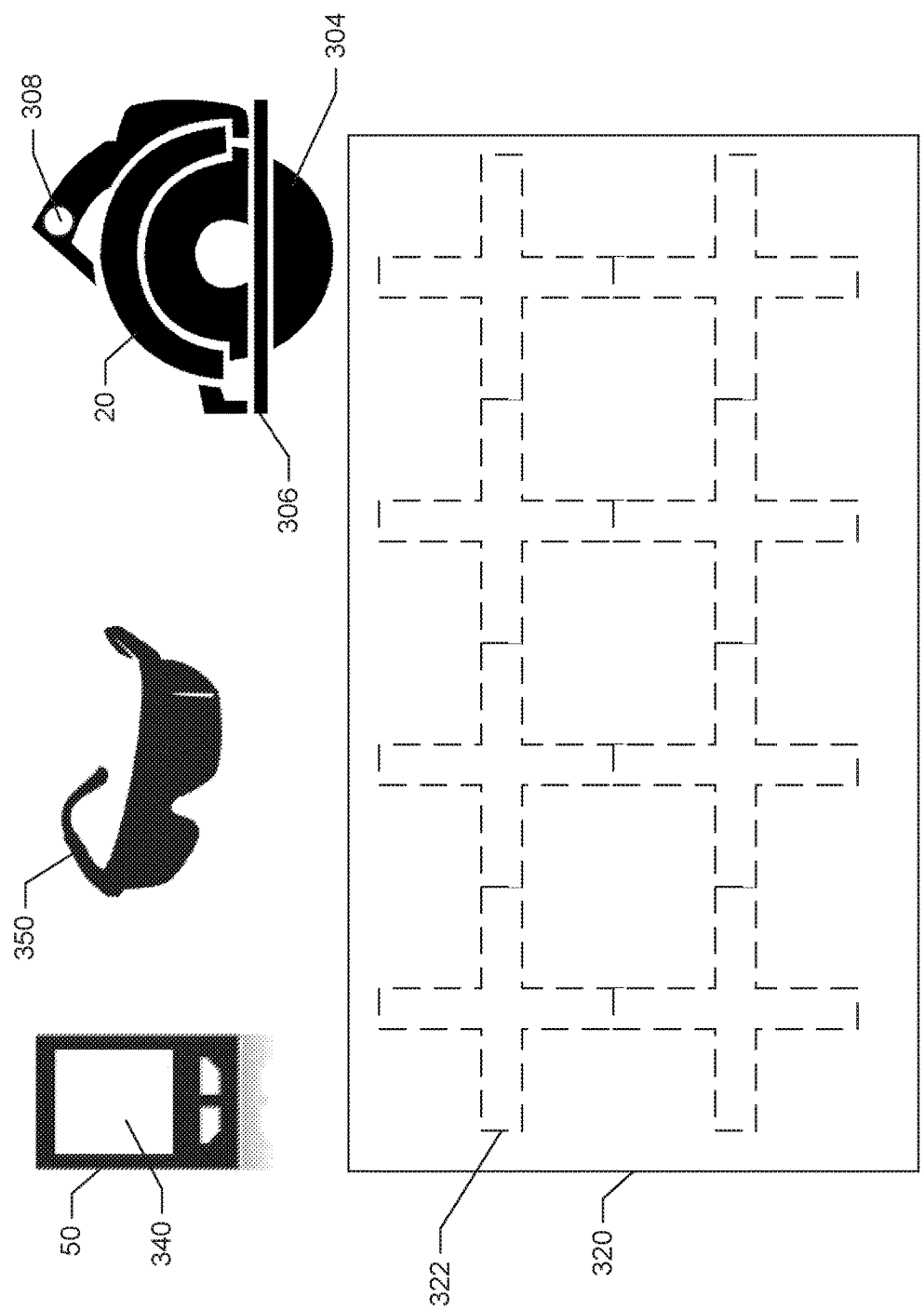
FIG. 3 illustrates an example construction site according to an example embodiment.

FIG. 3 illustrates an example construction site according to an example embodiment. The construction site may include one or more construction devices 20, such as saws, nailers, jackhammers, or the like. The construction device 20 may include a working element 304, such as a blade, nail driver, or the like, configured to perform work such as cutting or nailing, on a working material 320. The working material 320 may be wood, drywall, plaster board, concrete, brick, stone, or other materials. In some instances the working material 320 may include a density gradient 322. A CSS may include the determination of a presence of the density gradient 322 in a working material 320 and causing an automatic response, such as an indication to be activated or a performance adjustment of the construction device based on the presence of the density gradient, as discussed below.

A density gradient 322, as used herein shall be interpreted as a change in material density caused by a material which has a significantly different density than the working material 320, for example rebar in a concrete working material; or wooden stud, piping, or electrical cables in a drywall or plaster wall. Although, density gradients 322 may typically include materials which are more dense than the working material 320, density gradients 322 may also be materials which are significantly less dense than the working material 320, such as an air gap or form foam in a concrete wall.

In some instances, the density gradient 322 may affect the performance of the construction device 20. For example, in an instance in which the density gradient 322 is more dense than the working material 320, the working element 304, such as a blade may overheat or be damaged; the construction device 20 may bind, jerk forward, buck backward; or nails or other fasteners may not properly penetrate, when the working element 304 engages the density gradient 322. In an instance in which the density gradient 322 is less dense than the working material 320, the blade speed may increase; the construction device 20 may jerk forward; or nails may be driven excessively deep or through the working material 320 when the working element engages the density gradient 322.

In an example embodiment, the construction device 20 may include one or more sensors 306, which may be at least a portion of the sensor network 140. The sensor 306 may be configured to detect conditions indicative of a density gradient 322 in the working material 320. In an example embodiment, the sensor 306 may be a magnetic sensor. The magnetic sensor may detect ferrous or magnetic materials, such as steel, iron, cobalt, nickel, or the like, for example rebar in concrete or nails and brackets in wood. In some example embodiments, the sensor 306 may be a temperature sensor. The temperature sensor may detect the temperature of the working element 304 or the working material 320. The temperature of the working element 304 or working material 320 may increase when engaging a material causing a density gradient 322 which is more dense than the working material 320, and decrease when engaging a material causing a density gradient 322 which is less dense than the working material 320. In an example embodiment, the sensor 306 may be a vibration sensor, such as a vibrometer. The vibrometer may detect the vibration of the working material 320 or working element 304 during operation of the construction device 20. The presence of the material causing the density gradient 322 may cause the working material 320 to vibrate more or less than the working material 320 in the absence of the material causing the density gradient 322. In some example embodiments, the sensor 306 may include a light sensor. The light sensor may detect materials which are typically less dense than the working material 320, e.g. air, translucent or transparent materials, such as polymers, or the like. In some example embodiments, the sensor 306 may be an electromagnetic field (EMF) sensor. The EMF sensor may detect an electromagnetic field generated by a material, such as electrical cabling.

In an example embodiment, the CSS monitoring device 100, may receive sensor data from the sensor 306. The CSS monitoring device 100 may determine the presence of a density gradient 322 in the working material 320 based on the sensor data. For example, in an instance in which the sensor 306 is a magnetic sensor, light sensor or an EMF sensor, the detection of a ferrous material, light or an electromagnetic field, respectively, may indicate presence of a density gradient 322 in the working material 320.

In an example embodiment, the CSS monitoring device 100 may compare the sensor data to one or more predetermined material thresholds to determine presence of a density gradient 322 in the working material 320. In an example embodiment the CSS monitoring device 100 may include preprogrammed material thresholds, such as 1 lumen for light data, 130 degrees for temperature data, 1 N/C for EFM data, or the like, satisfying the predetermined threshold may be indicative of a density gradient 322 in the working material 320. In some embodiments, the CSS monitoring device may include dynamically programmed material thresholds, for example, set after the construction device 20 starts or after a predetermined period of operation. In one such example, the CSS monitoring device 100 may set a material threshold for temperature 25 degrees higher or 10 degrees cooler than the operating temperature of the working element 304 after 30 seconds of operation. In some examples, material thresholds for sensor data from magnetic sensors, vibration sensors, or EMF sensors may be utilized to determine proximity or size of the dense material 322 relative to the construction device 20.

In some example embodiments, the CSS monitoring device 100 may include multiple material thresholds associated with a particular sensor data. For example, the CSS monitoring device 100 may include a material threshold for an increase and a material threshold for a decrease in the indication sensor data, such as working material or working element temperature. Additionally or alternatively, the CSS monitoring device 100 may include two or more material thresholds in the same relative direction, such as a first material threshold set to 10 degrees above an operating temperature and a second threshold set at 25 degrees above the operating temperature.

In an example embodiment, the CSS monitoring device 100 may cause an automatic response, such as actuation of an indicator or a performance adjustment of the construction device 20, based on the determination of the presence of the density gradient 322.

In an example embodiment, the CSS monitoring device may cause an indicator 308, such as user interface 130, to be actuated associated with the construction device 20 based on the determination of the presence of the density gradient 322. In some example embodiments, the construction device 20 may include an indicator 308. The indicator 308 may include one or more lights, such as LEDs, liquid crystal displays (LCDs), graphical user interfaces (GUIs), or the like. In an instance in which no density gradient 322 is detected in the working material 320, the indicator may indicate no density gradient detected, such as by not illuminating any lights, illuminating a normal, e.g. green light, or representing no density gradient 322 on the LCD or GUI.

In an instance in which the CSS monitoring device 100 determines the presence of a density gradient 322, the CSS monitoring device 100 may cause the indicator 308 to actuate. For example, the indicator may illuminate a red light, or display and indication of density gradient presence on the LCD or GUI.

In an instance in which the CSS monitoring device 100 utilizes multiple material thresholds or ranges, the CSS monitoring device 100 may actuate the indicator 308 to indicate the threshold level, a size, or proximity of the density gradient 322 to the construction device 20. For example, the indicator 308 may illuminate a yellow light and/or orange light in an instance in which a first threshold is satisfied and a red light may be illuminated in an instance in which a second threshold is satisfied. In an instance in which the indicator 308 is a LCD or display the indicator 308 may display bars or other representation of the threshold level, size, or proximity of the density gradient 322 relative to the construction device 20.

Additionally or alternatively, the indicator 308 may include a vibration motor, such as in a handle of the construction device 20. The vibration motor may be activated to indicate the presence of density gradient 322 in the work material. In an instance in which multiple material thresholds are utilized the strength of the vibration may be increased for each successive threshold which is satisfied.

In additional or alternative embodiments, the indicator 308 may be incorporated in a personnel device 50, such as a personal data assistant, smart phone, safety glasses 350, or the like. The personnel device 50 may be associated with the construction device 20, by scanning a tag on the construction device, proximity, manual enter of serial numbers, or the like. The CSS monitoring device 100 may cause the indicator 308, such as a display 340 of the personnel device 50 associated with the construction device 20, to indicate a density gradient presence, in a manner similar to those described above.

Figure 4:
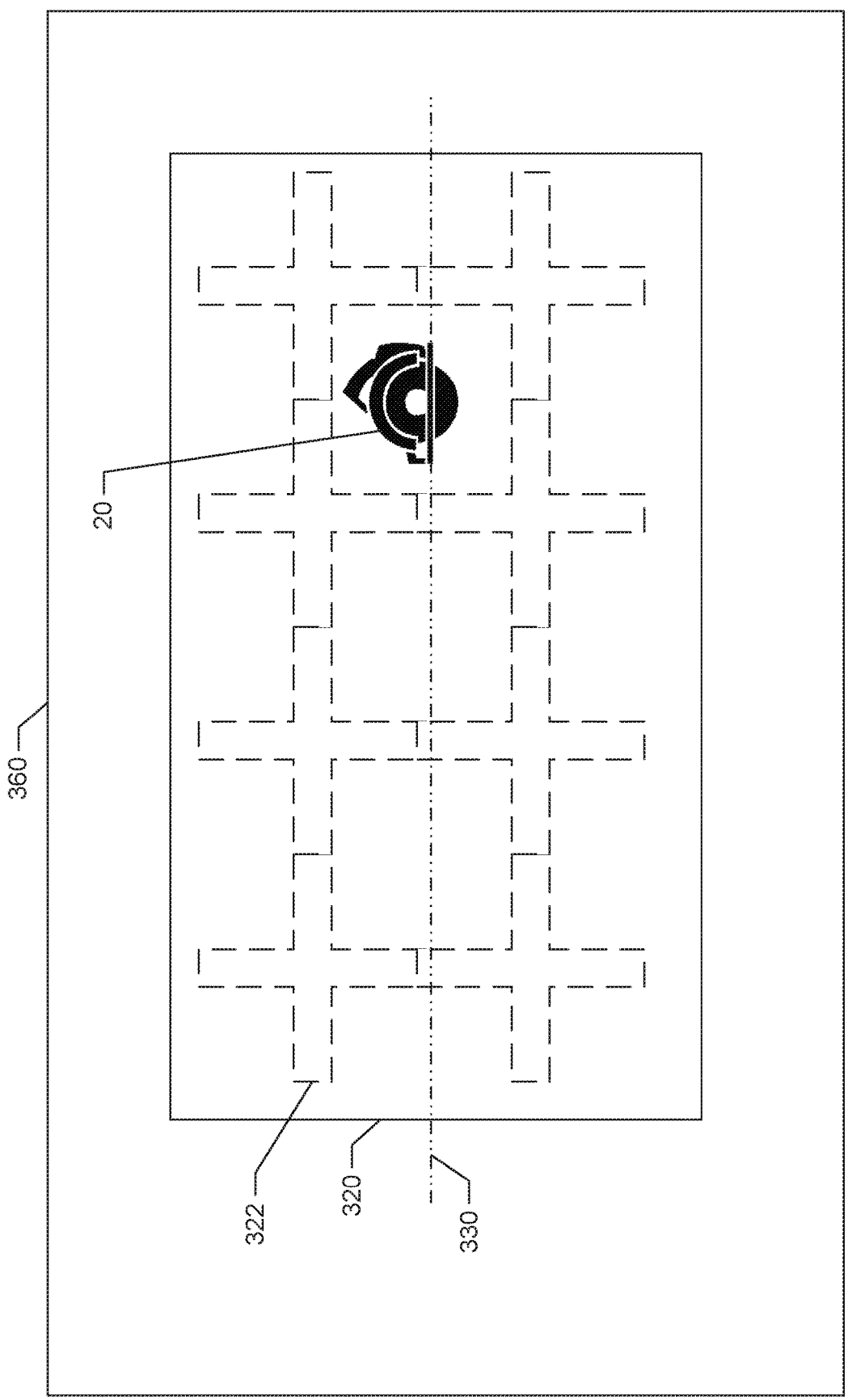
FIG. 4 illustrates a material density map according to an example embodiment.

In some example embodiments, the CSS monitoring device 100 may generate a material density map based on the sensor data. An example material density map 360 is depicted in FIG. 4. The material density map 360 may include the working material 320 and determine location and/or size of density gradients 322. The CSS monitoring device 100 may use movement data, such as from movement sensors to determine a propagation line 330 for the construction device 20. In an example embodiment, the propagation line 330 may include previous relative locations and future locations of the construction device 20. The density map 360 may include a position of the construction device 20 relative to the working material 320 and/or the density gradient 322.

In an example embodiment the indicator 308, such as display 340 of the personnel device 50, safety glasses 350, or a GUI on the construction device 20, may include an augmented reality display. The CSS monitoring device 100 may receive location data from the construction device 20. The density map 360 may include the location of the construction device 20. In an example embodiment in which a user may see through the personnel device 50, such as the safety glasses 350, the personnel device may determine the location of the construction device 20 in a field of view, such as based on proximity detection, location data, infrared scanning of a bar code or QR code, object detection, or the like. The personnel device 50 may project an image of the material density map 360 by aligning the location of the construction device 20 in the field of view with the position of the construction device in the material density map 360. In an example embodiment, wherein the personnel device 20 is a PDA, smart phone, or the like; or the construction device 20 includes a GUI, the personnel device 50 or construction device 20 may include a camera configured to capture camera data and generate a virtual field of view. The virtual field of view may be displayed on the display 340 or GUI. The augmented reality density map 360 may be overlaid on the virtual field of view in a manner substantially similar to the field of view of the safety glasses 350, as discussed.

In some example embodiments, the CSS monitoring device 100 may be configured to cause a performance adjustment of the construction device 20 based on the determination of the presence of the density gradient 322 in the working material 320. The performance adjustment may be a change in speed of the working element 304, a change in flow of coolant or lubrication to the working element 304, a change in force applied to the working element 304, a change in a moving direction of the working element 304, or the like. For example, the rotation per minute (RPM) of a blade may be slowed, the flow of coolant or lubrication may be increased, the force applied to the working element 304 may be reduced, the moving direction of the construction device 20 may be reversed, in an instance in which a density gradient 322, which is more dense that the working material 320, is determined to be present. In an instance in which a density gradient 322, which is less dense that the working material 320, is determined to be present, the RPM of a blade may be increased, coolant or lubrication flow to the working element 304 may be reduced, and/or the force applied to the working element 304 may be increased.

In some cases, a method of utilizing CSS analysis in relation to operation of the CSS monitoring device 100 and/or one or more construction devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction devices 20 according to the method.

In an example embodiment, the method may include receiving sensor data from a sensor associated with a construction device at operation 402, determining a presence of a density gradient in a working material at operation 406, and causing an automatic response relative to operation of the working element based on the determination of the presence of a density gradient at operation 408.

In some embodiments, the method may include additional, optional operations, and/or the operations described above may be modified or augmented. Some examples of modifications, optional operations, and augmentations are described below, as indicated by dashed lines, Comparing sensor data to one or more predetermined material thresholds at operation 404 and generating a material density map based on the determination of the presence of the density gradient in the working material at operation 410.

In an example embodiment, the CSS monitoring device 100 may comprise a processor (e.g. the processor 112) or processing circuitry 110 configured to perform some or each of the operations (402-410) described above. The processor 112 may, for example, be configured to perform the operations (402-410) by performing hardware implemented logical functions, executing stored instructions, or executing algorithms for performing each of the operations. In some embodiments, the processor 112 or processing circuitry 110 may be further configured for additional operations or optional modifications to operations 402-410. In this regard, for example in an example embodiment, the processing circuitry is further configured to compare the sensor data to a predetermined material threshold, and determining the presence of the density gradient in the working material is based on the comparison of the sensor data to the predetermined material threshold. In an example embodiment, the automatic response includes causing an indicator associated with the construction device to be actuated. In an example embodiment, the indicator includes a light associated with construction device. In some example embodiments, the indicator includes a plurality of status lights and the plurality of status lights are actuated based on the determination of the presence of the density gradient. In an example embodiment, the processing circuitry is further configured to generate a material density map based on the determination of the presence of the density gradient in the working material. In some example embodiments, the indicator includes a graphical user interface and causing the indicator to be actuated includes displaying the material density map on the graphical user interface. In an example embodiment, the indicator includes an augmented reality display and causing the indicator to be actuated includes displaying the material density map on the augmented reality display. In some example embodiments, the sensor comprises a magnetic sensor, vibration sensor, light sensor, temperature sensor, or electromagnetic field sensor. In an example embodiment, the automatic response includes causing a performance adjustment of the construction device based on the determination of the presence of the density gradient in the working material. In some example embodiments, the performance adjustment includes a change in speed of the working element. In an example embodiment, the performance adjustment includes a change in flow of a coolant or lubricant to the working element. In some example embodiments, the performance adjustment includes a change in force applied to the working element. In an example embodiment, the performance adjustment includes a change in moving direction to the working element.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction site status monitoring device comprising processing circuitry configured to:
   receive sensor data from a sensor associated with a construction device comprising a working element;
   determine a presence of a density gradient in a working material based on the sensor data; and
   cause an automatic response relative to operation of the working element based on the determination of the presence of the density gradient,
   wherein the automatic response comprises causing a performance adjustment of the construction device based on the determination of the presence of the density gradient in the working material, and
   wherein the performance adjustment comprises a change in flow of a coolant or lubricant to the working element.

2. A construction site status monitoring device comprising processing circuitry configured to:
   receive sensor data from a sensor associated with a construction device comprising a working element;
   determine a presence of a density gradient in a working material based on the sensor data; and
   cause an automatic response relative to operation of the working element based on the determination of the presence of the density gradient,
   wherein the automatic response comprises causing a performance adjustment of the construction device based on the determination of the presence of the density gradient in the working material, and
   wherein the performance adjustment comprises a selected one of an increase and a decrease in force applied to the working element.

3. The construction site status monitoring device of claim 2, wherein the processing circuitry is further configured to:
   compare the sensor data to a predetermined material threshold, and
   wherein determining the presence of the density gradient in the working material is based on the comparison of the sensor data to the predetermined material threshold.

4. The construction site status monitoring device of claim 2, wherein the automatic response comprises causing an indicator associated with the construction device to be actuated.

5. The construction site status monitoring device of claim 4, wherein the indicator comprises a light associated with the construction device.

6. The construction site status monitoring device of claim 4, wherein the indicator comprises a plurality of status lights, wherein the plurality of status lights are actuated based on the determination of the presence of the density gradient.

7. The construction site status monitoring device of claim 4, wherein the processing circuitry is further configured to:
   generate a material density map based on the determination of the presence of the density gradient in the working material.

8. The construction site status monitoring device of claim 7, wherein the indicator comprises a graphical user interface, and wherein causing the indicator to be actuated comprises displaying the material density map on the graphical user interface.

9. The construction site status monitoring device of claim 7, wherein the indicator comprises an augmented reality display, and wherein causing the indicator to be actuated comprises displaying the material density map on the augmented reality display.

10. The construction site status monitoring device of claim 2, wherein the sensor comprises a magnetic sensor, vibration sensor, light sensor, temperature sensor, or electromagnetic field sensor.

11. The construction site status monitoring device of claim 2, wherein the performance adjustment comprises a change in speed of the working element.

12. The construction site status monitoring device of claim 2, wherein the construction site status monitoring device is located remotely from the construction device.

13. A construction site status monitoring device comprising processing circuitry configured to:
   receive sensor data from a sensor associated with a construction device comprising a working element;

determine a presence of a density gradient in a working material based on the sensor data; and cause an automatic response relative to operation of the working element based on the determination of the presence of the density gradient, wherein the automatic response comprises causing a performance adjustment of the construction device based on the determination of the presence of the density gradient in the working material, and wherein the performance adjustment comprises reversing in a moving direction of the working element, the working element comprising a blade.

14. A construction site status monitoring system comprising:

a construction device comprising a sensor and a working element; and a construction site monitoring device comprising processing circuitry configured to:

receive sensor data from the sensor;

determine a presence of a density gradient in a working material based on the sensor data; and cause an automatic response relative to operation of the working element based on the determination of the presence of the density gradient, wherein the automatic response comprises causing a performance adjustment of the construction device based on the determination of the presence of the density gradient in the working material, and wherein the performance adjustment comprises a selected one of an increase and a decrease in force applied to the working element.

15. The construction site status monitoring system of claim 14, wherein the processing circuitry is further configured to:

compare the sensor data to a predetermined material threshold, and wherein determining the presence of the density gradient in the working material is based on the comparison of the sensor data to the predetermined material threshold.

16. The construction site status monitoring system of claim 14, wherein the automatic response comprises causing an indicator associated with the construction device to be actuated.

17. The construction site status monitoring system of claim 16, wherein the processing circuitry is further configured to generate a material density map based on the determination of the presence of the density gradient in the working material.

18. The construction site status monitoring system of claim 17, wherein the indicator comprises a graphical user interface, and wherein causing the indicator to be actuated comprises displaying the material density map on the graphical user interface.

* * * * *